(12) United States Patent
Motamedhashemi

(10) Patent No.: US 10,113,209 B2
(45) Date of Patent: Oct. 30, 2018

(54) METHODS AND SYSTEMS FOR PRODUCING HIGH CARBON CONTENT METALLIC IRON USING COKE OVEN GAS

(71) Applicant: Mirmohammadyousef Motamedhashemi, Charlotte, NC (US)

(72) Inventor: Mirmohammadyousef Motamedhashemi, Charlotte, NC (US)

(73) Assignee: MIDREX TECHNOLOGIES, INC., Charlotte, NC (US)

( * ) Notice: Subject to any disclaimer, the term of this patent is extended or adjusted under 35 U.S.C. 154(b) by 291 days.

(21) Appl. No.: 15/001,333

(22) Filed: Jan. 20, 2016

(65) Prior Publication Data

US 2016/0208351 A1 Jul. 21, 2016

Related U.S. Application Data

(60) Provisional application No. 62/105,395, filed on Jan. 20, 2015, provisional application No. 62/105,454, filed on Jan. 20, 2015.

(51) Int. Cl.
*C21B 13/00* (2006.01)
*F27B 1/08* (2006.01)
(Continued)

(52) U.S. Cl.
CPC ........ *C21B 13/004* (2013.01); *C21B 13/0073* (2013.01); *C21B 13/02* (2013.01);
(Continued)

(58) Field of Classification Search
CPC ... C21B 13/004; C21B 13/0073; C21B 13/02; C21B 13/029; F27B 1/08; F27D 17/002; F27D 17/008
(Continued)

(56) References Cited

U.S. PATENT DOCUMENTS 4,365,789 A 12/1982 Scarlett et al.
4,793,856 A 12/1988 Price-Falcon et al.
(Continued)

OTHER PUBLICATIONS

Apr. 21, 2016 International Search Report issued in International Patent Application No. PCT/US2016/13843.
(Continued)

*Primary Examiner* — Scott R Kastler
*Assistant Examiner* — Michael Aboagye
(74) *Attorney, Agent, or Firm* — Clements Bernard Walker PLLC; Christopher L. Bernard

(57) ABSTRACT

A method for producing high carbon content metallic iron using coke oven gas, including: dividing a top gas stream from a direct reduction shaft furnace into a first top gas stream and a second top gas stream; mixing the first top gas stream with a coke oven gas stream from a coke oven gas source and processing at least a portion of a resulting combined coke oven gas stream in a carbon dioxide separation unit to form a synthesis gas-rich gas stream and a carbon-dioxide rich gas stream; delivering the synthesis gas-rich gas stream to the direct reduction shaft furnace as bustle gas; using the carbon-dioxide rich gas stream as fuel gas in one or more heating units; and delivering the second top gas stream to the direct reduction shaft furnace as bustle gas.

12 Claims, 1 Drawing Sheet

(51) Int. Cl.
*F27D 17/00* (2006.01)
*C21B 13/02* (2006.01)

(52) U.S. Cl.
CPC .............. *C21B 13/029* (2017.05); *F27B 1/08* (2013.01); *F27D 17/002* (2013.01); *F27D 17/008* (2013.01); *Y02P 10/122* (2015.11); *Y02P 10/126* (2015.11); *Y02P 10/128* (2015.11); *Y02P 10/132* (2015.11); *Y02P 10/136* (2015.11); *Y02P 10/143* (2015.11)

(58) Field of Classification Search
USPC .......................... 266/154; 75/489, 490, 505
See application file for complete search history.

(56) References Cited

U.S. PATENT DOCUMENTS

| | | | |
|---|---|---|---|
| 4,822,411 A | | 4/1989 | Standler et al. |
| 4,880,458 A | * | 11/1989 | Martinez-Vera ........ C21B 13/02 75/495 |
| 4,889,323 A | | 12/1989 | Pusch et al. |
| 6,027,545 A | | 2/2000 | Villarreal-Trevino |
| 6,328,946 B1 | | 12/2001 | Stephens, Jr. |
| 6,986,800 B2 | * | 1/2006 | Duarte-Escareno .... C21B 5/008 75/458 |
| 8,496,730 B2 | * | 7/2013 | Metius .................... C21B 13/02 266/156 |
| 2004/0226406 A1 | | 11/2004 | Stephens, Jr. |
| 2009/0211401 A1 | | 8/2009 | Zendejas-Martinez et al. |
| 2010/0051875 A1 | | 3/2010 | Chornet et al. |
| 2010/0162852 A1 | * | 7/2010 | Becerra-Novoa ............................ C21B 13/0073 75/433 |
| 2011/0277591 A1 | | 11/2011 | Metius et al. |
| 2012/0068120 A1 | | 3/2012 | Menzel et al. |
| 2014/0260803 A1 | * | 9/2014 | Zendejas-Martinez ..................... C21B 13/02 75/505 |

OTHER PUBLICATIONS

Peter Diemer, Klaus Knop, Hans Bodo Lungen, Martin Reinke, Carl-Dieter Wuppermann; "Utilization of Coke Oven Gas for the Production of DRI" (Technik + Trends—Metallurgic); Stahl and Eisen 127 (2007) Nr. 1; Paper presented at STAHL 2006 Conference on Nov. 9, 2006 in Dusseldorf.

\* cited by examiner

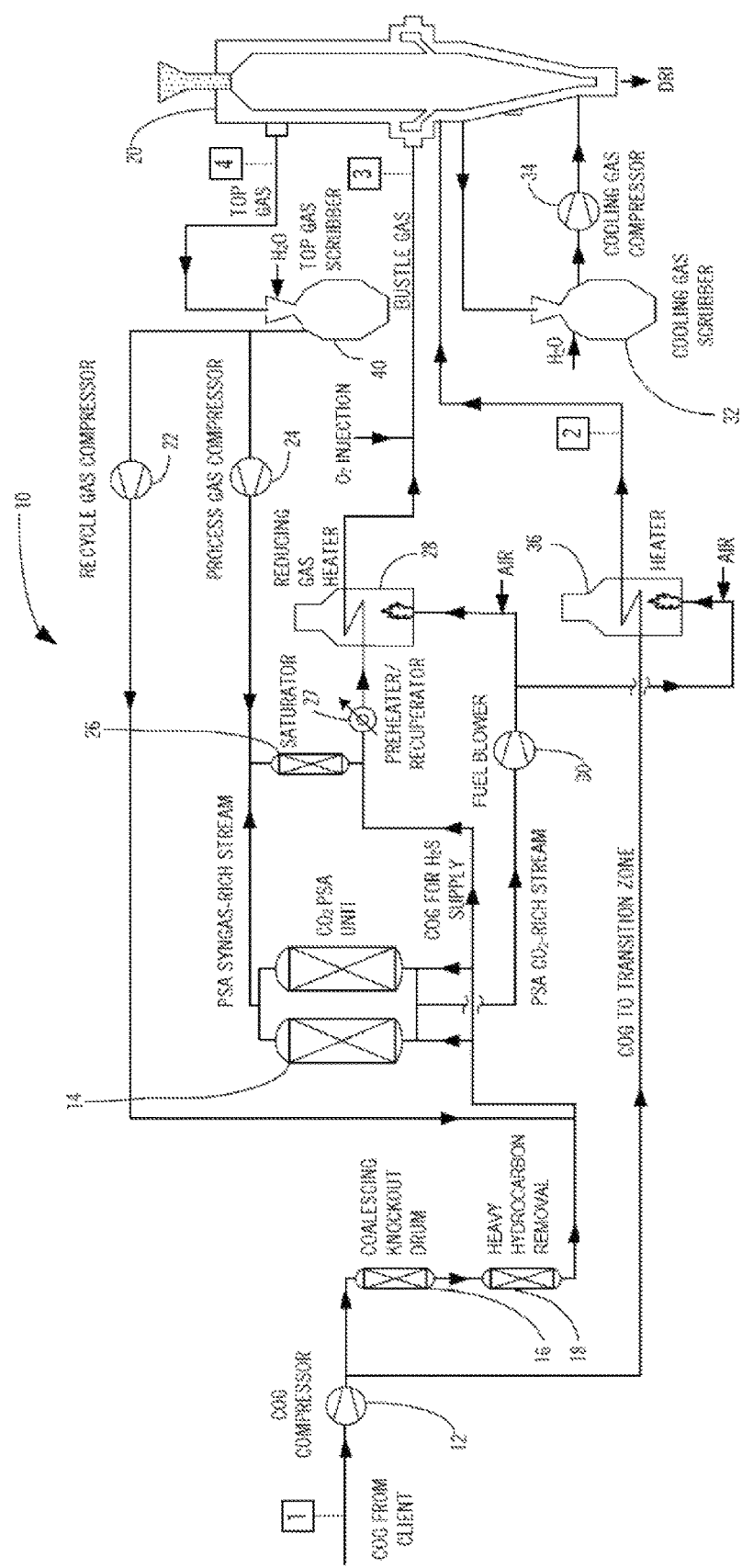

METHODS AND SYSTEMS FOR PRODUCING HIGH CARBON CONTENT METALLIC IRON USING COKE OVEN GAS

CROSS-REFERENCE TO RELATED APPLICATIONS

The present patent application/patent claims the benefit of priority of U.S. Provisional Patent Application No. 62/105,395, filed on Jan. 20, 2015, and entitled "METHOD AND SYSTEM FOR REDUCING IRON OXIDE TO METALLIC IRON USING COKE OVEN GAS," and U.S. Provisional Patent Application No. 62/105,454, filed on Jan. 20, 2015, and entitled "METHODS AND SYSTEMS FOR PRODUCING HIGH CARBON CONTENT METALLIC IRON USING COKE OVEN GAS," the contents of both of which are incorporated in full by reference herein.

FIELD OF THE INVENTION

The present invention relates generally to methods and systems for producing high carbon content metallic iron using coke oven gas (COG) or the like. The proposed methods make use of a selective separation unit (which can be a pressure swing adsorption (PSA) system or the like) designed specifically to separate carbon dioxide ($CO_2$) and methane ($CH_4$) from a mixture of different gases, including COG and synthesis gas (Syngas). The product $CO_2$-lean gas stream, which is rich in methane ($CH_4$), mixes with the COG and Syngas, and is used to reduce iron oxide to metallic iron; while the residual $CO_2$-rich gas stream is used as fuel in different sections of the direct reduction (DR) process. Due to the high $CH_4$ content of the reducing gas in this reformer-free arrangement, the produced direct reduced iron (DRI) contains high carbon, which in turn makes the downstream steelmaking processes more efficient.

BACKGROUND OF THE INVENTION

DRI, which is sometimes referred to as sponge iron, is typically produced by the reaction between iron ore and a reactive gas stream containing reducing agents like $H_2$ and CO. In commercialized DR processes, a hydrocarbon source is normally utilized to produce the reducing agents via a catalytic (e.g., tubular reformer) or non-catalytic (e.g., partial oxidation (PDX)) reforming process. All of these reforming processes convert some portion of the hydrogen and carbon content of the hydrocarbons into $H_2$ and CO, respectively.

In conventional DR processes, a hot $H_2$/CO-rich stream (referred to as a reducing gas stream) flows into a reduction reactor, typically a vertical shaft reactor, and reacts with iron oxides based on the following global reactions:

    (1)

    (2)

Although the above simplified reaction scheme does not describe much about the details of the gas-solid reactions occurring during the reduction of iron ores with $H_2$ and CO, it adequately shows the overall fate of the reducing agents, $H_2$ and CO, inside the reduction reactor, i.e., they are converted to $H_2O$ and $CO_2$, respectively.

In order to prevent reverse reforming reactions (i.e., methanation reactions) inside the reduction reactor, some $CH_4$ in the form of natural gas (NG) or the like is typically added to the reducing gas stream before flowing into the reduction reactor.

Due to the equilibrium-limited nature of reduction reactions under practical operating conditions, the presence of reduction reaction products, $H_2O$ and $CO_2$ (i.e., oxidants), in the reacting mixture inhibits the complete utilization of the $H_2$ and CO supplied to the reduction reactor. Therefore, top gas that is the spent gas coming off the reduction reactor still contains considerable amounts of the reducing agents, and it is worth removing the oxidants and reusing unreacted $H_2$ and CO for further reduction. In commercialized DR processes, the removal of $H_2O$ is usually carried out by quenching the top gas down to ambient temperature to condense out the majority of its moisture content. However, the removal of $CO_2$ is not so straightforward, and typically requires the installation of a separate process to capture the $CO_2$ from the top gas. Although there are many successfully commercialized processes for this purpose, all of them require significant capital investments and have high operating costs.

The product DRI can be then used as a good source of low-residual iron, in addition to pig iron and ferrous scrap in the production of steel, mainly through an electric arc furnace (EAF) in a steelmaking facility. The EAF melts the charged material by means of an electric arc. The presence of carbon in the DRI loaded into EAF is equivalent to adding chemical energy to the EAF when oxygen is injected into the EAF. Partial and complete combustion of the carbon with oxygen provides a uniform internal source of energy within the EAF charge. Furthermore, the conversion of $Fe_3C$ into iron and carbon is an exothermic reaction, which improves the thermal efficiency of the EAF as well. Therefore, the carbon content of the DRI can be interpreted as an energy source, and this energy is finally utilized in the EAF when the DRI is melted. Although other carbon sources, such as coal or used rubber, can be added to the EAF for the same purpose, the resulting yield is significantly less than the combined carbon in DRI due to particle blow-off and impurities existing in these carbon sources.

Inside the reduction reactor, carbon can be generated (i.e., physical carbon-C) or added to the DRI (i.e., chemical carbon-$Fe_3C$) mainly through the following global reactions:

    (3)

    (4)

    (5)

    (6)

    (7)

    (8)

Therefore, two major sources for combined carbon (i.e., chemical+physical) are CO and hydrocarbons (e.g., $CH_4$) in the reducing gas stream.

One widespread source of hydrocarbons in the iron and steel industry is COG, which typically contains 20.0%-28% methane. Due to this considerable $CH_4$ concentration, COG can be reformed into $H_2$ and CO in order to reduce iron oxide to metallic iron, in the form of DRI, hot direct reduced iron (HDRI), or hot briquetted iron (HBI) in a direct reduction plant. A typical COG stream coming from a COG treatment plant also contains between 50.0%-65.0% $H_2$, 4.0%-8.0% CO, up to 2.0% aromatics (typically in the form of BTX), and up to 5.0% of higher hydrocarbons like ethane, propane, and some kinds of olefins. Because of the high concentration of $H_2$ in a COG stream, reforming COG typically results in a Syngas with significantly higher $H_2$/CO, as compared to reforming natural gas. In other words, the amount of carbon introduced into the shaft furnace in the form of CO is less in the case of COG reforming.

The presence of such high concentrations of $H_2$ in COG also has adverse consequences for both catalytic and non-catalytic reforming processes since it is the main product of reforming reactions; and, therefore, reduces the efficiency of the reforming reactions. In other words, since the rate of reforming reactions is slower in the presence of high concentrations of hydrogen, more energy is consumed to reform the hydrocarbons to $H_2$ and CO. At the same time, although a typical COG stream can contain up to 65.0% of reducing agents CO and $H_2$, with no reforming step, the $CH_4$ content of the COG will accumulate within the system if the COG flows directly into the DR process loop.

In addition, the presence of heavy hydrocarbons, such as olefins and aromatics, along with very heavy hydrocarbons, such as tar and naphthalene (typically in the form of liquid carry-over), as well as sulfur compounds (typically more than 100 ppm), in the COG makes it difficult to reform the COG in conventional catalytic processes, as these components deactivate the commercial reforming catalysts relatively easily. Accordingly, expensive cleaning processes are typically required to remove these components from the COG upstream of the catalytic reformers, which in turn makes the whole process extremely costly, as compared to other non-catalytic methods, such as PDX.

Thus, the present "state of the art" describes an economic DR process for the production of high carbon content DRI when COG is the available source of hydrocarbons for the plant, in which top gas divides into two different streams. One portion mixes with COG and flows into a selective separation unit, such as a pressure swing adsorption (PSA) system with solid adsorbent or the like, for the adjustment of $CO_2$ and $CH_4$ content, while the other portion of the gas bypasses the separation unit. The product gas from the separation unit then blends with the bypassed stream before flowing to a heater. The resulting hot gas coming from the heater contains a high amount of $CH_4$ (preferably more than 6.0%) and a low amount of $CO_2$ (preferably less than 3.0%). Due to this high $CH_4$ content, the product DRI contains a high combined carbon content before leaving the hot section of the reduction furnace based on the following reactions:

$$3Fe + CH_4 \Leftrightarrow Fe_3C + 2H_2 \quad (5)$$

$$CH_4 \Leftrightarrow C + 2H_2 \quad (8)$$

The proposed design does not include any reforming step; and, therefore, is cost effective and simple in both operation and maintenance. In fact, in case of using solid adsorbent materials in a PSA system, the separation unit acts as a $N_2$ and $CH_4$ concentration adjustor, performs $CO_2$ removal, performs sulfur removal, and acts as a fuel generating unit at the same time. Consequently, almost all of the top gas can be recycled to the process loop for boosting the plant capacity.

The flow sheet of the present invention also offers outstanding performance in terms of oxygen consumption for producing DRI. While a PDX-based design requires more than 60 $Nm^3$ of oxygen per ton of produced metallic iron, the proposed design needs less than 30 $Nm^3$ of oxygen per ton of produced metallic iron, when COG is used as the main external source of reducing agents in the plant.

Finally, the present invention makes use of industrially well-practiced technologies for separation purposes. Numerous selective separation technologies units have been installed all around the world by different vendors for the selective separation of components from gas streams; and, thus, more than adequate industrial experience exists for this application.

BRIEF SUMMARY OF THE INVENTION

The object of the present invention is to develop an efficient and cost effective process by which commercially available COG streams are used in a direct reduction plant to produce metallic iron containing a high amount of carbon. The present invention provides a method to effectively use the $H_2$ and CO content of both COG stream and top gas stream, without the need for any reforming step. The keys to success of the design are:
1. To precisely divide the top gas into two portions;
2. To mix COG with the first portion of the divided top gas;
3. To utilize a selective separation unit to remove the surplus $CH_4$ and $CO_2$ from the aforementioned mixture to form a treated stream with desirable $CO_2$ and $CH_4$ content; and
4. To mix the second portion of the top gas with the treated stream.

For a DR plant that uses COG as the main source for the feed and fuel, the following main advantages are:
1. The proposed process is very cost effective since it does not include the reforming step, and, thus, its required auxiliary/utility units, e.g., combustion system, catalyst, heat recovery unit, blowers, etc;
2. The selective separation unit accomplishes many tasks all in one step: a) the desulfurization of COG, which enhances the quality of the produced DRI, since highly sulfur-loaded DRI has negative effects on steelmaking processes, e.g., higher energy consumption due to time requirements when melting DRI; b) $CO_2$ removal from the top gas, which improves the quality of the reducing gas; c) balancing the $N_2$ and $CH_4$ content of the process gas to avoid their buildup within the process loop; and d) acting as a fuel generating unit, which makes the plant independent of any outsources for fuel;
3. It demands significantly less $O_2$ as compared to a typical PDX process for the same DRI production rate;
4. The carbon content of the product DRI is high because of high $CH_4$ content of the reducing gas;
5. The whole plant is self-sufficient in fuel, since the heating value of the $CO_2$-rich gas is significantly more than both the COG and Syngas; and, therefore, no external source for fuel is necessary for successful operation of the plant; and
6. Specific energy consumption is only 2.30-2.40 Gcal per ton of the produced metallic iron, which is comparable to or better than other systems.

Again, the present invention provides a DR process for the production of high carbon content DRI when COG is the available source of hydrocarbons for the plant, in which the spent gas leaving the reduction furnace divides into two different streams. The first stream mixes with COG and flows into a selective separation unit, such as a pressure swing adsorption (PSA) system with solid adsorbent or the like, for the adjustment of $CO_2$ and $CH_4$ content, while the second stream of the gas bypasses the separation unit. The preferred ratio of these two portions is about 0.3-0.6. The product gas from the separation unit then blends with the bypassed stream before flowing to a heater. The resulting hot gas coming from the heater contains a high amount of $CH_4$ (preferably more than 6.0%) and a low amount of $CO_2$ (preferably less than 3.0%). Due to this high $CH_4$ content, the product DRI contains high combined carbon content before leaving the hot section of the reduction furnace based on the following reactions:

The proposed design does not include any reforming step; and, therefore, is cost effective and simple in both operation and maintenance. In fact, in case of using solid adsorbent materials in a PSA system, the separation unit acts as a $N_2$ and $CH_4$ concentration adjustor, performs $CO_2$ removal, performs sulfur removal, and acts as a fuel generating unit at the same time. Consequently, almost all of the top gas can be recycled to the process loop for boosting the plant capacity.

The flow sheet of the present invention also offers outstanding performance in terms of oxygen consumption for producing DRI. While a PDX-based design requires more than 60 $Nm^3$ of oxygen per ton of produced metallic iron, the proposed design needs less than 30 $Nm^3$ of oxygen per ton of produced metallic iron, when COG is used as the main external source of reducing agents in the plant.

The proposed flowsheet can be implemented in designing DR plants with different product discharge methods including cold direct reduced iron (CDRI), hot direct reduced iron (HDRI), hot briquetted iron (HBI), or any combination of them.

Finally, the present invention makes use of industrially well-practiced technologies for separation purposes. Numerous selective separation technologies units have been installed all around the world by different vendors for the selective separation of components from gas streams; and, thus, more than adequate industrial experience exists for this application.

In one exemplary embodiment, the present invention provides a method for producing high carbon content metallic iron using coke oven gas, including: treating at least a portion of a coke oven gas stream from a coke oven gas source in order to remove liquids, aerosols, and heavy hydrocarbons from it using a series of coalescing knockout drums and beds of solid adsorbent, preferably charcoal and activated carbon; dividing a cold and clean top gas stream containing 10-20% CO, 5-15% $CO_2$, 40-55% $H_2$, and 4-10% $CH_4$, balanced with $N_2$ and $H_2O$, into a first top gas stream and a second top gas stream; mixing the first top gas stream with the treated coke oven gas and processing at least a portion of a resulting combined gas, which contains 10-20% CO, 5-15% $CO_2$, 40-65% $H_2$, and 7-20% $CH_4$, balanced with $N_2$ and $H_2O$, in a selective separation unit to adjust its $CO_2$ and $CH_4$ content and to form a synthesis gas-rich gas stream containing 10-20% CO, 1-3% $CO_2$, 40-65% $H_2$, and 7-20% $CH_4$, balanced with $N_2$ and $H_2O$, and to form a carbon-dioxide rich gas stream containing 10-20% CO, 20-40% $CO_2$, 15-35% $H_2$, and 5-20% $CH_4$, balanced with $N_2$ and $H_2O$; mixing the synthesis gas-rich gas stream with the second top gas stream and delivering the resulting mixture to the direct reduction shaft furnace as bustle gas; and using the carbon-dioxide rich gas stream as fuel gas in one or more heating units. The method further including one or more of cooling and cleaning the top gas stream in a scrubbing unit. The method further including compressing the coke oven gas stream in a compressor. The method further including delivering at least a portion of the coke oven gas stream to the direct reduction shaft furnace as a transition zone gas stream. The method further including heating the transition zone gas stream in a heating unit. The method further including compressing the first top gas stream in a compressor. The method further including compressing the second top gas stream in a compressor. The method further including treating one or more of the second top gas stream and the synthesis gas-rich gas stream in a saturator. The method further including adding at least a portion of the treated compressed coke oven gas stream to one or more of the second top gas stream and the synthesis gas-rich gas stream. The method further including heating one or more of the second top gas stream and the synthesis gas-rich gas stream in a heating unit. The method further including boosting the pressure of the carbon-dioxide rich gas stream in a blower. The method further including injecting oxygen into one or more of the second top gas stream and the synthesis gas-rich gas stream. The method further including withdrawing a cooling gas stream from a middle portion of the direct reduction shaft furnace, one or more of cooling and cleaning the cooling gas stream in a scrubbing unit, compressing the cooling gas stream in a compressor, and injecting the cooling gas stream into a lower portion of the direct reduction shaft furnace.

In another exemplary embodiment, the present invention provides a system for producing high carbon content metallic iron using coke oven gas, including: a conduit for dividing a top gas stream from a direct reduction shaft furnace into a first top gas stream and a second top gas stream; a conduit for delivering a coke oven gas stream from a coke oven gas source to a series of guard vessels for further treatment; a conduit for mixing the first top gas stream with the treated coke oven gas and processing at least a portion of a resulting combined gas stream in a selective separation unit to form a synthesis gas-rich gas stream and a carbon-dioxide rich gas stream; a conduit for delivering the synthesis gas-rich gas stream to the direct reduction shaft furnace as bustle gas; one or more heating units using the carbon-dioxide rich gas stream as fuel gas; and a conduit for delivering the second top gas stream to the direct reduction shaft furnace as bustle gas. The system further including a scrubbing unit for one or more of cooling and cleaning the top gas stream. The system further including a compressor for compressing the coke oven gas stream. The system further including a coalescing knockout drum unit for cleansing at least a portion of the coke oven gas stream of liquids and aerosols. The system further including packed-beds of solid adsorbent for further cleansing at least a portion of the compressed coke oven gas stream of heavy hydrocarbons, liquids, and aerosols. The system further including a conduit for delivering at least a portion of the treated compressed coke oven gas stream to the direct reduction shaft furnace as a transition zone gas stream. The system further including a compressor for compressing the first top gas stream. The system further including a heating unit for heating the transition zone gas stream. The system further including a compressor for compressing the second top gas stream. The system further including a saturator for treating one or more of the second top gas stream and the synthesis gas-rich gas stream. The system further including a conduit for adding at least a portion of the treated compressed coke oven gas stream to one or more of the second top gas stream and the synthesis gas-rich gas stream. The system further including a heating unit for heating one or more of the second top gas stream and the synthesis gas-rich gas stream. The system further including an oxygen source for injecting oxygen into one or more of the second top gas stream and the synthesis gas-rich gas stream. The system further including means for withdrawing a cooling gas stream from a middle portion of the direct reduction shaft furnace, one or more of cooling and cleaning the cooling gas stream in a scrubbing unit, compressing the cooling gas stream in a compressor, and injecting the cooling gas stream into a lower portion of the direct reduction shaft furnace.

BRIEF DESCRIPTION OF THE DRAWINGS

The present invention is illustrated and described herein with reference to the various drawings, in which like reference numbers are used to denote like method steps/system components, and in which:

FIG. 1 is a schematic diagram illustrating one exemplary embodiment of the method and system for producing high carbon content metallic iron using COG of the present invention.

DETAILED DESCRIPTION OF THE INVENTION

Again, the present invention provides a DR process for the production of high carbon content DRI when COG is the available source of hydrocarbons for the plant, in which the spent gas leaving the reduction furnace divides into two different streams. One portion mixes with COG and flows into a selective separation unit, such as a pressure swing adsorption (PSA) system with solid adsorbent or the like, for the adjustment of $CO_2$ and $CH_4$ content, while the other portion of the gas bypasses the separation unit. The product gas from the separation unit then blends with the bypassed stream before flowing to a heater. The resulting hot gas coming from the heater contains a high amount of $CH_4$ (preferably more than 6.0%) and a low amount of $CO_2$ (preferably less than 3.0%). Due to this high $CH_4$ content, the product DRI contains high combined carbon content before leaving the hot section of the reduction furnace based on the following reactions:

$$3Fe+CH_4 \Leftrightarrow Fe_3C+2H_2 \quad (5)$$

$$CH_4 \Leftrightarrow C+2H_2 \quad (8)$$

The proposed design does not include any reforming step; and, therefore, is cost effective and simple in both operation and maintenance. In fact, in case of using solid adsorbent materials in a PSA system, the separation unit acts as a $N_2$ and $CH_4$ concentration adjustor, performs $CO_2$ removal, performs sulfur removal, and acts as a fuel generating unit at the same time. Consequently, almost all of the top gas can be recycled to the process loop for boosting the plant capacity.

The flow sheet of the present invention also offers outstanding performance in terms of oxygen consumption for producing DRI. While a PDX-based design requires more than 60 $Nm^3$ of oxygen per ton of produced metallic iron, the proposed design needs less than 30 $Nm^3$ of oxygen per ton of produced metallic iron, when COG is used as the main external source of reducing agents in the plant.

Finally, the present invention makes use of industrially well-practiced technologies for separation purposes. Numerous selective separation technologies units have been installed all around the world by different vendors for the selective separation of components from gas streams; and, thus, more than adequate industrial experience exists for this application.

Referring now specifically to FIG. 1, in one exemplary embodiment, the process 10 starts with the compression of the COG in a COG compressor 12 to a required value set by the vendor of the PSA unit 14, for example 5-7 barg. Among the available methods, PSA systems with solid adsorption materials are among the best fits with this application. However, other selective separation methods can also be implemented, such as vacuum pressure swing adsorption (VPSA) systems with solid adsorption materials, temperature swing adsorption (TSA) systems, cryogenic systems, or any combination of these systems. The compressed COG first passes through a coalescing knockout drum 16 in order to prevent the entry of liquids into the subsequent PSA unit 14. The coalescer section in the knockout drum 16 is important, because heavier hydrocarbons, like BTX, naphthalene, or tar, may pass through normal knockout drums as aerosols (i.e., very small droplets) and diminish the performance of the PSA unit 14. Thus, the coalesce section of the knockout drum 16 preferably screens the majority of such aerosols. Alternative methods, like cold traps, can also be used, instead of the coalescing knockout drum 16, as the guard system for the PSA unit 14. Compressed COG then flows into the packed-beds of charcoal or activated carbon 18 for complete aerosol removal. Due to high porosity of activated carbon or charcoal adsorbents, they also remove a portion of gas-phase heavy hydrocarbons existing in COG. The packed-bed units 18 can be designed as a regenerative system, such as a temperature swing adsorption (TSA) unit.

Some portion of the COG can be taken off before the guard system 16 and be sent to a preheater 36, preferably a convective type or the like. In this case, the preheated stream can flow into activated carbon or charcoal guard beds 18 to recover the trapped hydrocarbons from them, and therefore regenerate the guard beds 18. This hot gas rich in hydrocarbons can be injected directly into the reduction furnace 20. This, in turn, cuts the operating cost of the guard unit 18, and improves the carbon deposition efficiency inside the shaft furnace 20.

The top gas off the reduction reactor 20 runs through a scrubber 40, preferably a packed-bed venturi type or the like, to condense the majority of its moisture content, and for dust/gangue removal. The cold and clean gas then divides into two streams: one portion of the gas flows to a process gas compressor 24 and then into a saturator 26 installed upstream of a recuperater 27 and a heater 28, eventually flowing to the shaft furnace 20 as bustle gas, after optional oxygen injection; and the rest of the gas flows to a recycle gas compressor 22. The high-pressure recycle gas afterwards mixes with the compressed COG stream after guard beds and the resulting mixture flows to the PSA unit 14 for further treatment.

The tail gas (i.e., waste gas) coming off the separation unit 14, now rich in $CO_2$, $H_2S$, HCN, BTX, $CH_4$, and heavy hydrocarbons, flows to the various combustion units in the plant, including those associated with the various heaters 28 and 36. A blower 30, if needed for these applications, can boost its pressure, and air injection may be provided.

The product gas leaving the separation unit 14 is rich in $H_2$, CO, and $CH_4$, and blends with the first portion of the cold and clean top gas to make the total process gas upstream the heater 28. This heater 28 elevates the temperature of the process gas up to the preferably 950° C. proper for reduction reactions inside the reduction reactor 20. This gas mixture afterwards flows into the reduction reactor 20 to produce the high carbon content metallic iron. The shaft furnace 20 can also incorporate a loop including a scrubber 32 and a compressor 34 for recycling spent gas to the lower portion of the shaft furnace 20.

Table 1. Below summarizes selected conditions at various points in the process.

TABLE 1

Selected Conditions at Various Points in the Process

|  | 1 | 2 | 3 | 4 |
|---|---|---|---|---|
| Flow, (Nm³/h) | 130,500 | 30,500 | 462,422 | 524,851 |
| Temperature, (° C.) | 25 | 40 | 1000 | 450 |
| Pressure, (barg) | 0.05 | 2.13 | 2.47 | 0.95 |
| CO | 8.9 | 8.9 | 13.4 | 11.3 |
| $CO_2$ | 3.9 | 3.9 | 4.6 | 7.3 |
| H2 | 53.6 | 53.6 | 54.2 | 41.5 |
| $H_2O$ | 0.9 | 0.9 | 4.7 | 21.4 |
| $CH_4$ | 25.0 | 25.0 | 8.9 | 6.0 |
| $N_2$ | 4.9 | 4.9 | 14.1 | 12.5 |
| $O_2$ | 0.5 | 0.5 | 0.0 | 0.0 |
| $C_3H_8$ | 0.4 | 0.4 | 0.0 | 0.0 |
| $C_2H_4$ | 1.8 | 1.8 | 0.0 | 0.0 |
| BTX | 0.1 | 0.1 | 0.0 | 0.0 |

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A method for producing high carbon content metallic iron using coke oven gas, comprising:
    dividing a top gas stream from a direct reduction shaft furnace into a first top gas stream and a second top gas stream;
    treating a coke oven gas stream from a coke oven gas source in one or more guard vessels to remove liquid droplets, aerosols, and heavy hydrocarbons from the coke oven gas stream;
    mixing the first top gas stream with the treated coke oven gas stream and processing at least a portion of a resulting combined gas stream in a selective separation unit to form a synthesis gas-rich gas stream and a carbon-dioxide rich gas stream;
    delivering the synthesis gas-rich gas stream to the direct reduction shaft furnace as bustle gas;
    using the carbon-dioxide rich gas stream as fuel gas in one or more heating units;
    delivering the second top gas stream to the direct reduction shaft furnace as bustle gas; and
    delivering at least a portion of the coke oven gas stream to the direct reduction shaft furnace as a transition zone gas stream at a temperature that is lower than a temperature of the bustle gas.

2. The method of claim 1, further comprising one or more of cooling and cleaning the top gas stream in a scrubbing unit.

3. The method of claim 1, further comprising compressing the first top gas stream in a compressor.

4. The method of claim 1, further comprising compressing the coke oven gas stream in a compressor.

5. The method of claim 1, further comprising cleaning at least a portion of the coke oven gas stream of liquid droplets, aerosols, and heavy hydrocarbons using a coalescing knock-out drum unit followed by packed-beds of solid adsorbent.

6. The method of claim 1, further comprising heating the transition zone gas stream in a heating unit.

7. The method of claim 1, further comprising compressing the second top gas stream in a compressor.

8. The method of claim 1, further comprising treating one or more of the second top gas stream and the synthesis gas-rich gas stream in a saturator.

9. The method of claim 1, further comprising adding at least a portion of the treated coke oven gas stream to one or more of the second top gas stream and the synthesis gas-rich gas stream.

10. The method of claim 1, further comprising heating one or more of the second top gas stream and the synthesis gas-rich gas stream in a heating unit.

11. The method of claim 1, further comprising injecting oxygen into one or more of the second top gas stream and the synthesis gas-rich gas stream.

12. The method of claim 1, further comprising withdrawing a cooling gas stream from a middle portion of the direct reduction shaft furnace, one or more of cooling and cleaning the cooling gas stream in a scrubbing unit, compressing the cooling gas stream in a compressor, and injecting the cooling gas stream into a lower portion of the direct reduction shaft furnace.

* * * * *